United States Patent [19]

Bakhir et al.

[11] Patent Number: 5,427,667
[45] Date of Patent: Jun. 27, 1995

[54] APPARATUS FOR ELECTROCHEMICAL TREATMENT OF WATER

[76] Inventors: Vitold M. Bakhir, ulitsa Svobody, 47, kv.81; Jury G. Zadorozhny, Ryazansky prospekt, 54, kv.95; Jury A. Rakhmanin, Seleznevskaya ulitsa, 30, korpus 3, kv.83; Igor N. Naida, ulitsa Onezhskaya, 18, korpus 3, kv.65; Nikolai N. Naida, 8 ulitsa Sokolinoi Gory, 8, korpus 2, kv.186; Nugzar V. Dzheiranishvili, Voronezhskaya ulitsa, 8, korpus 3, kv.204; Boris I. Leonov, Oktyabrskaya ploschad, 1, kv.23; Sergei K. Butin, Krivokolenny pereulok, 11/13, kv.18; Viktor G. Vedenkov, Chernomorsky bulvar, 4, kv.349, all of Moscow, Russian Federation

[21] Appl. No.: 157,039
[22] PCT Filed: Mar. 26, 1993
[86] PCT No.: PCT/RU93/00075
 § 371 Date: Mar. 25, 1994
 § 102(e) Date: Mar. 25, 1994
[87] PCT Pub. No.: WO93/20014
 PCT Pub. Date: Oct. 14, 1993

[30] Foreign Application Priority Data

Apr. 3, 1992 [RU] Russian Federation ............ 5035665
Apr. 3, 1992 [RU] Russian Federation ............ 5035666
Apr. 3, 1992 [RU] Russian Federation ............ 5035757
Apr. 3, 1992 [RU] Russian Federation ............ 5035767

[51] Int. Cl.$^6$ ............................................. C02F 1/461
[52] U.S. Cl. ................... 204/260; 204/263; 204/272; 204/275
[58] Field of Search ................ 204/260, 263, 272, 275

[56] References Cited

U.S. PATENT DOCUMENTS 4,378,276  3/1983  Liggett et al. ............. 204/149
5,108,563  4/1992  Cook ........................ 204/272

FOREIGN PATENT DOCUMENTS 20175123  3/1986  European Pat. Off. .
20286233  10/1988  European Pat. Off. .
10300793  1/1989  European Pat. Off. .
5654559  2/1986  Switzerland .

OTHER PUBLICATIONS

Bakhir et al., "Electrochemical pre-model reactors" (1991) vol. 4 Moscow, no month.

Primary Examiner—John Niebling
Assistant Examiner—Arun S. Phasge
Attorney, Agent, or Firm—Ladas & Parry

[57] ABSTRACT

An apparatus for electrical treatment of water can be used for purifying and disinfecting potable water, and also for producing detergent and disinfecting solutions, and comprises at least one electrochemical cell made up of an upright cylindrical electrode and a rod electrode of a variable cross-section mounted coaxially in dielectric sleeves, an ultrafiltration diaphragm made from ceramics based on zirconium oxide and coaxially mounted in the sleeves between the electrodes, the geometrical dimensions of the cell meet some definite relationships. The system of openings in the electrodes and ducts in the sleeves provides for the optimal hydraulic characteristics of the cell. The sleeves and cylindrical electrode have the same external diameter and the cells are specially secured by means of gaskets in the upper and lower headers of a dielectric material with cylindrical sockets in each and supply and discharge ducts. The headers have several sockets each or are made as a built-up structure composed of units having one socket each, and are provided with means for sealing and bracing the structure, and the cells accommodated in the sockets are hydraulically connected in parallel and electrically connected in parallel and series-parallel. The apparatus can also comprise flow rate control devices adapted to meter a reagent and mounted at the water supply line, containers with a catalyst and a hydraulic connection. The apparatus permits of reducing the electric power consumption, simplifying the design, reducing labour expenditures in assembly and disassembly of the apparatus, and also makes it possible to widen the functional potentialities due to simplifying and unifying the hydraulic system of the apparatus.

10 Claims, 5 Drawing Sheets

| Principle diagram. | Graphic explanation. |
|---|---|

APPARATUS FOR ELECTROCHEMICAL TREATMENT OF WATER

FIELD OF THE INVENTION

The present invention relates to chemical engineering, and more particularly, to apparatus as for electrochemical treatment of water with a view to purifying thereof or monitoring the acid-base properties, oxidation-reduction properties and catalytic activity of water, and can be used for water purification and disinfection (until potable water is obtained from contaminated one), or producing detergent and disinfecting solutions.

BACKGROUND OF THE INVENTION

In applied electrical chemistry, use is made of electrolyzers of various design, which ensure water treatment.

Known in the art is an electrolyzer for water treatment, which comprises a case divided by a diaphragm into an anode chamber and a cathode chamber with perforated electrodes accommodated within them and pressed against the diaphragm, the electrode surface facing the diaphragm is covered with an electrical insulation material, and the perforations are coaxial (USSR Inventor's Certificate No. 882944, C02F1/46, 1979).

The working surface of this electrolyzer diaphragm is restricted by the area of the perforations in the electrodes, which brings about an increase in weight and size, makes the apparatus more complex in design and requires considerable labour consumption in assembly, disassembly, sealing of the flat pack of electrodes and the diaphragm pressed between them with simultaneous matching of the multiple openings in the electrodes. Because of the non-uniform current distribution, chemical ageing of the diaphragm material and worsening of the electrolyzer characteristics take place.

An apparatus is also known for separate production of water treated in anode and cathode compartments, i.e. catholyte and anolyte, from salted water, used, respectively, as detergent and disinfection solutions in medicine ("Medical electrochemactivator", informational paper 03049 of 27/02/87). The apparatus includes a diaphragm flowtype electrolyzer with plane electrodes and a supply assembly combined with a control unit. The conventional solution is disadvantageous in that it features inadequate hydrodynamics, mixing of the products of the electrochemical reactions when using diaphragms of considerable flow, and also considerable manual labour requirements in the assembly and repair of the electrolyzer with plane electrodes.

The apparatus for water electrolysis (Japanese Patent Application No. 1-104387, C02F1/46, 1989), most close to the apparatus according to the present invention as to the engineering solution and the result achieved, comprises a cylindrical electrolyzer with coaxial electrodes and a diaphragm therebetween arranged in dielectric sleeves, said diaphragm dividing the internal space into a cathode chamber and an anode chamber. Each chamber is provided with a separate inlet in the lower sleeve and a separate outlet in the upper sleeve of the electrolyzer, said inlet and outlet being in communication with intake and exhaust hydraulic lines for water flow under pressure. The apparatus also includes a d.c. current source connected to the electrolyzer electrode through a switching unit ensuring polarity alteration of the electrodes to eliminate cathode deposit with simultaneous switching of the hydraulic lines, providing for continuous feeding of the solutions from the anode and cathode chambers without mixing thereof. It is noted that the apparatus makes it possible to obtain the electrochemically treated water with bactericide properties.

The disadvantages of the known solution to the problem are large energy losses in water treatment, particularly of water time variable mineralization. The wider the range of possible water mineralization variations, the higher must be the electric power of the used d.c. current source. There are practically no cases when the power of the current source is used effectively to a full extent.

Moreover, the apparatus fails to ensure the stable characteristics of the solutions obtained with little mineralization of the source water.

When a considerable increase or decrease of the apparatus capacity is required, electrolyzers of the corresponding size and, hence, various design must be used. Each particular design implementation features the most effectiveness for the pre-determined operating conditions and cannot be used to advantage in the wide range of mineralization, volumetric flow, specific expenditures of electric energy and other parameters, and also requires individual sets of the basic and spare parts and units, appliances for assembly, adjustment, repair and maintenance. Electrolyzers employing one and the same design circuit but having different geometrical dimensions have different electrochemical characteristics. This requires development of various maintenance rules for each type of a kind of the electrolyzer.

Assembly and disassembly of high-capacity electrolyzers require considerable expenditures of labour and materials.

In high-capacity electrolyzers, the diaphragm and electrodes having a developed surface are subjected to deforming forces with variations of pressure and flow rate of water. This reduces the reliability and service life of the apparatus, causes worsening of the technical characteristics because of distortions of the electrode compartment geometry. Particularly drastic worsening manifests itself when treating water with a low salt concentration, since selfdeveloping processes of local concentrations of the electrolysis products arise which bring about the formation of stagnation zones, local heat build-up and appearance of "spotty" conductivity.

DISCLOSURE OF THE INVENTION

An object of the present invention is to reduce electric power consumption, to simplify the design, to reduce labour expenditures in assembly and disassembly of the apparatus and also to widen the functional potentialities due to simplifying and unifying the hydraulic circuit of the apparatus.

This object is achieved in an apparatus for electrochemical water treatment, comprising an electrochemical cell made up of vertical coaxial cylindrical and rod electrodes mounted in dielectric sleeves, a ceramic diaphragm coaxially mounted in the sleeves between said electrodes and dividing the electrode spacing into electrode chambers, the upper and lower sleeves being provided with ducts for supply and discharge of the water being treated into the rod electrode chamber, a current source connected to the electrodes through a switching unit, and also appliances for supply and discharge of the water being treated into the electrode chambers of the electrochemical cell, wherein at least one cell is provided, the ducts in the sleeves open on the side surfaces of the sleeves, the upper and lower portions of the cylindrical electrode are provided with openings for discharge and supply of the water being treated into the cylindrical electrode chamber, thereby defining the working portion of the chamber, said rod electrode is of a variable cross-section with the diameter of its ends 0.75 of the diameter of its middle portion, said rod electrode being mounted so that its middle portion with a larger diameter is at the level defines by the openings in the upper and lower portions of said cylindrical electrode, said diaphragm being ultrafiltration one made from ceramics based on a zirconium oxide with addition of aluminium and yttrium oxides and being mounted so that the geometrical dimensions of the cell satisfy the relationships:

$$\frac{K}{\ln(L)} = \frac{Ds}{Db} \text{ and } \frac{Ss}{Sb} = 0.7 - 0.8$$

wherein

K = electrode spacing, mm,
L = distance between openings in the lower and upper portions of the cylindrical electrode, mm,
Ds = internal diameter of the cylindrical electrode, mm,
Db = diameter of the middle portion of the rod electrode, mm,
Ss, Sb are the cross-sectional areas of the chambers, respectively, of the cylindrical and rod electrodes.

Besides, the dielectrical sleeves and cylindrical electrode have the same external diameter, the surface of the cylindrical electrode, respectively, over the opening in the lower portion and under the opening in the upper portion and the surface of the sleeves, respectively, under and over the openings of the ducts are formed with grooves, the appliances for supplying and discharging water being, respectively, made as a lower and an upper header from dielectric material with cylindrical sockets in each, and supply and discharge ducts, said cell being rigidly secured in said sockets by means of resilient gaskets accommodated in the grooves in the sleeves and cylindrical electrode, the supply and discharge ducts of the cell and headers forming common hydraulical spaces.

Said headers can be made as a monolithic part with several sockets or as a built-up structure from units with a single socket and having means for sealing and bracing the structure, the cells installed in the sockets being hydraulically connected in parallel, said switching unit being connected with the electrodes of all the cells, said cells being electrically connection either in series, or in parallel, or in series-parallel.

Such a design makes it possible to simplify the construction assemble electrolyzers of various capacity with minimum costs and stability of characteristics. In addition, such a design allows easily stocking the apparatus with the required auxiliary devices, such flow rate control devices, containers with a catalyst, devices for metering regents added to the water being treated, depending on the requirements for the water being treated and conditions of the problems being solved.

A combination of the above-mentioned dimensions of the electrodes and diaphragm ensures uniform distribution of the water flow, similar flow rate in the electrode chamber section. There are no conditions for forming stagnation zones which adversely effect the characteristics of the electric reactor, have the ability to be self-sustained and developed. The products of electrochemical reactions accumulate in the stagnation zones, forming sediments of various density. The conductivity in these zone is higher than in the flow, that it why a considerable amount of current is expended to heat up water in the stagnation zones and locally to synthesize locally the electrolysis products rather than to transform electrochemically the flowing water.

The width of the electrode chambers meets the following two requirements: the distance between the electrode surface and diaphragm must not be large not to increase the ohmic resistance between the electrodes; it must not, however, be small not to cause cappolary and wedge-out effects hampering free flow of water with gas bubbles. The length of the electrode chambers is also specified taking into accout the actual operating conditions; they must not be too large for the gas filling of water not to rise two drastically as it approaches the outlet, but their length must be sufficiently large to ensure the sufficient degree of water transformation with a single flow through the apparatus. The above-mentioned relation between the width and length of the electrode chambers makes it possible to attain a good contact of all microvolumes of water with the electrode. Gas bubbles do not hamper free flow of water in the electrode chambers under convectional circulation condition, do not create stagnation zones owing to capillary wedging-out, do not increase electric resistance in the electrode spacing, i.e. no coalescence of the gas bubbles occurs in the electrode chamber, and a considerable rate of discharge ensures weak gas-filling of water. The entire water volume in the chamber is under the action of electric field of considerable non-uniformity, which gives rise to microcirculation ordered streams with accelerated mass transfer in the zone of a double electric layer on the electrode surface where the electric field strength reaches millions volts per centimeter.

Owing to the definite relation of the electrolytic cell dimensions, reduction of electric power expenditures is achieved, according to the present invention. As shown by experiment, observation of the relations given in the formula, the other conditions being equal, the specific consumption of electric energy in the treatment of tap water amounts to 0.75 to 1.25 kW h/cu.m, whereas, when these relations are not observed, electric energy consumption is about 3.0 kW h/cu.m. Since in the known solution to the problem, the relations of the cell dimensions are not specificall qulified, it is correct to state that the electric power consumptions in it will be at least the same as in the solution according to the present invention outside the above given relations. But in this case, additional effect is attained due to other design solutions, improvement of the hydraulic conditions in the electrode spacing, optimization of the process because of the use of the diaphragm of the present invention, and packing the apparatus.

The cell diaphragm is made from ceramics based on zirconium oxide with additions of aluminium and yttrium oxides. Owing to this, the diaphragm is highly stable to the action of concentrated and diluted water solutions of acids, alkalis, oxidizers, reducers, corrosive gases: chlorine, ozone, and had a lifetime of more than 10.000 hours.

The diaphragm is ultrafiltration one and has the flow capacity within 0.5 to 2.0 ml/$m^2$ h Pa. In the electrolysis process, charged ionic layers are formed on the diaphragm surface, with the potential difference across them being 2.5 V. Because of the charged surface ionic layers the electric field strength in the diaphragm increase by 30 to 40 V/cm, which is conductive to increasing the mobility of ions in the pores and to reducing its electric resistance. Moreover, the hydrophilic ceramic diaphragm has several more favourable properties. it is insensitive to water contamination with organic substances, cations of heavy metals. It can be easily multiply cleaned from cathode deposits by washing with an acid. Since the diaphragm is rigid, this facilitates its installation and disassembly, and also ensures its operation under varying pressure.

The electrode material is selected from those known in the art, depending on the service conditions which are defined by the reactor purpose. Use can be made of titanium electrodes with platinum or platinum-iridium coatings which are stable both in anode and cathode polarization, or with coatings of ruthenium dioxide or manganese dioxide, with pyrolitic graphite coatings, or polished titanium electrodes.

Making the rod electrode of a variable cross-section such that the diameter of its end portions is 0.75 of the diameter of its middle portion and locating it in assembly in such a way that its middle portion having a larger diameter is between the levels defined by the openings in the cylindrical electrode makes it possible to reduce electrode wear because at the locations of the openings the geometry of the electric field between the electrode varies, which can cause creation of local voltage rises and non-uniform wear of the electrodes. Increasing the electrode spacing in this place also permits of stable operation of the diaphragm. Besides, the expenditure of electrode material is reduced. Making the diameter of the end portions of the rod electrode less than 0.75 of the diameter of its middle portion is unreasonable, since it causes formation of stagnation zones. Making them more than 0.75 fails to ensure the preset degree of the electrode safe operation.

Providing openings in the lower and upper portions of the cylindrical electrode, which are connected, respectively, to the supply and discharge lines of the water being treated, leads to the creation of optimal hydrodynamic conditions in the cylindrical electrode chamber. Besides, this brings about simplification of the structure as a whole, that is, makes more simple manufacture and mounting of the dielectric sleeves and simplifies the control of water flow through the cylindrical electrode chamber.

To prevent possible hydraulic resistances in the closed hydraulic spaces for feeding and discharge of water on the surfaces of the sleeves and cylindrical electrodes, grooves are provided at the level of the openings so that the openings are located in the grooves. Therefore, in assembly no strict alignment of the ducts in the headers and electrolytic reactors is required because the area of the formed flow section is sufficient to release the hydraulic pressures.

It is known to increase the capacity of the apparatus due to an increase of the number of electrolytic modules (USSR Inventors's Certificate No. 944430, CO2F1/46, 1981). The modules in the known apparatus are, however, housed in a common case, which increases the dimentions of the apparatus; besides, no provision is made for the product discharge from each particular module.

It is known in the applied electrochemistry to obtain the preset output of the electrochemical process due to making the electrolyzer built up of separate cells including electrodes and a diaphragm with a single flow of the electrolyte through the cell. The known solution to the problem is disadvantageous in that the electrochemical cells incorporate plane electrodes, and hence, high requirements are imposed on the electrodes which must be strictly parallel in assembly in order to provide their normal operation ("Applied electrochemistry", N. T. Kudryavtseva, Moscow, Khimiya, 1975, p. 155. FIGS. 5 to 16).

Besides, removal of separate cells requires disassembling of the electrolyzer as a whole.

In the apparatus according to the present invention, the cells are installed in smooth cylindrical sockets of the lower and upper heads. Such an arrangement reduces labour expenditures in assembly and disassembly, results in saving material because smooth cylindrical similar sockets are most simple in manufacture and reliable in multiple replacement of parts, are equally strong with the minimum volume of the surrounding material of the header.

Each header has two ducts connected in the lower heads with the inlets to the electrode chambers of the electrolytic cells, and in the upper header with the outlets of these chambers. This simplifies the construction due to making in a single unit (in the upper or in the lower header) of all hydraulic connections without application of separate pipelines.

Each electrolytic cell is sealed in the socket with three unified packing rings arranged in the annular grooves on the surfaces of the electrolytic cell and sleeve, and openings, i.e. the inlets and outlet of the electrode chambers, are provided in the two locations between the rings. Such an arrangement ensures savings in the material, reduction of the dimensions and design simplification. Sealing with standard packing rings provides for a rapid assembly of the reactor and efficient replacement of the electrolytic cell in repair.

Making the header from a dielectric material prevents the resistive coupling between the electrolytic cells without the use of a switching unit.

The header can be made as a single part with sockets for electrolytic cells. grooves for the main streams and openings for water distribution. This makes the electrolyzer compact in design.

The header can be made of separate modules, which permits the required capacity to be provided in each particular case by selecting the optimal number of the cells. In this case the header comprises a collector plate with ducts pulled up to the side surface of which with the aid of pins are collector shoes with sockets for electrolytic cells and openings aligned, through packings, with openings in the collector plate, which are connected withe ducts for the main streams. In this case, simplification of the design is achieved as well as widening of the functional potentialities, that is, an electrolyzer of any capacity is assembled with minimum labour expenditures from electrolytic cells secured in a collector plate of an appropriate length with the aid of collector shows. Assembling of the electrolyzer and replacement of cells in repair are simplified. Each electrode of the electrolyzer is connected to a device allowing series, parallel of mixed inter connection of the electrolytic cells. This permits selection, depending on mineralization of water being treated, of a most optimal electrical circuit of connecting the electrolytic cells and ensures savings of electric power, thereby enhancing the efficiency of the apparatus and widening the admissible range of water mineralization.

BRIEF DESCRIPTION OF THE DRAWINGS

The apparatus is presented in FIGS. 1 to 7.

DESCRIPTIONS OF THE PREFERRED EMBODIMENTS

The specific embodiments of the present invention given below are not the only possible embodiments of the invention. In all the exemplary embodiments, use is made of anodes manufactured from titanium with a coating of ruthenium dioxide, titanium cathodes and ultrafiltration diaphragms containing 60% zirconium oxides 3% yttium oxide and 27% aluminium oxide.

EXAMPLE 1

Figure 1A:
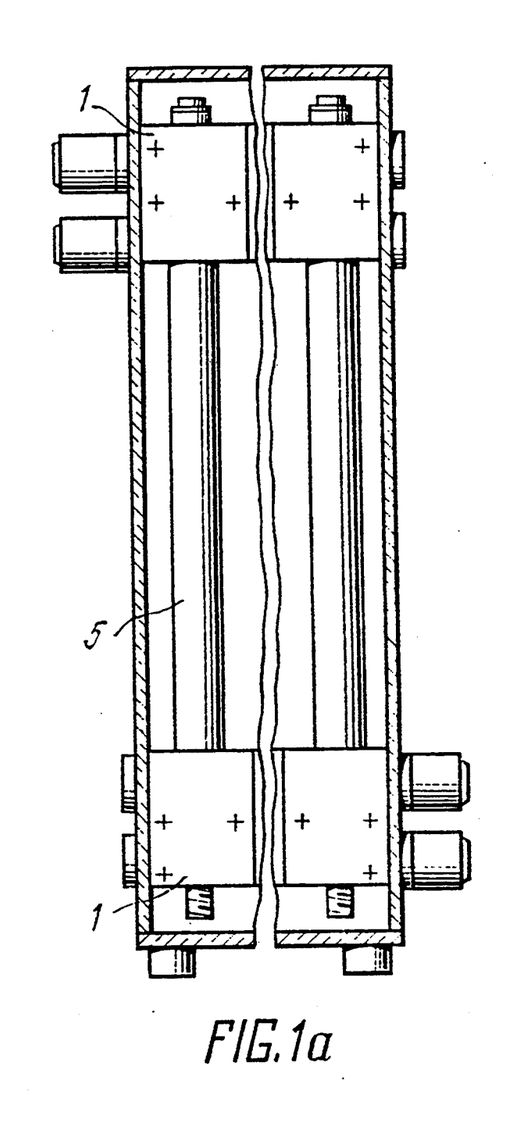
FIGS. 1a, 1b is a schematic diagram of the apparatus according to the present invention.
Figure 1B:
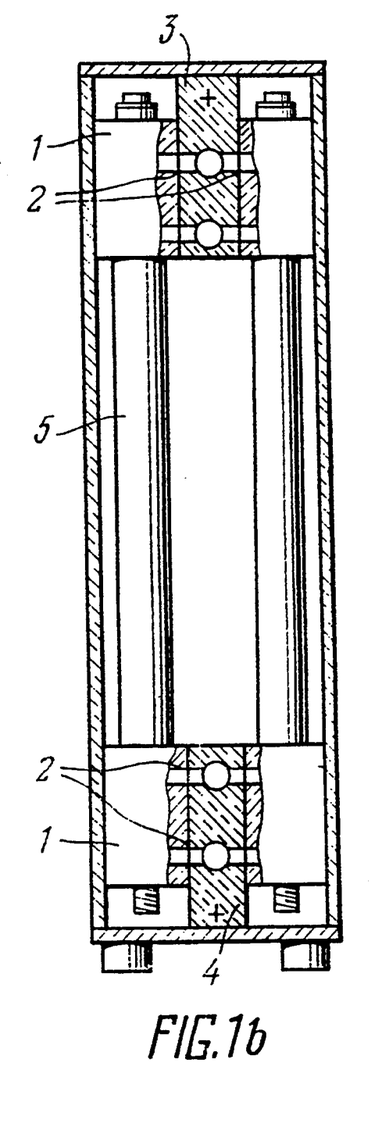

The apparatus for electrochemical treatment of water (FIG. 1) comprises collector shows 1 tightly connected with the aid of packing rings 2 to upper and lower headers 3, 4 which accommodate cells 5.

Cell 5 (FIG. 2) is a miniature diaphragm electrolyzer with a coaxial arrangement of an outer cylindrical, i.e. tubular electrode 6 and an inner rod cylinder electrode 7 and a tubular ceramic diaphragm 8 between them. The electrodes and diaphragm are rigidly tightly secured by means of elastic packing rings 9, 10 in end sleeves 11 made from dielectric material, which are the extensions of the external cylindrical surface of the cell (of the cylindrical electrode 6). Outlets 12, 13 and inlets 14, 15 of electrode chambers are provided on the external surface of the cell. They are formed as openings in the end sleeves 11 and at the ends of the cylindrical electrode 6 between grooves for packing rings 16. Assembly and sealing of the electrolytic cell is effected by bracing the sleeves 11 to the ends of the electrode 6 by means of nuts 17 with washers 18 on the ends of the electrode 7. The spacings between the electrodes 6 and 7 and the diaphragm 8 is 1.2 mm, the thickness of the ultrafiltration diaphragm 8 lies within 0.58 to 0.62 mm. The diameter of the internal rod electrode equals 6 to 8 mm. The effective part length of the diaphragm is 200 mm. The diaphragm effective surface is confined between the packing rings 9. The area of the effective surface of the cylindrical electrode is 88 cm$^2$, of the rod electrode is 50 cm$^2$. The ratio of the electrode surface area to the solution volume in the respective electrode chamber is 3.3 m.

Figure 2:
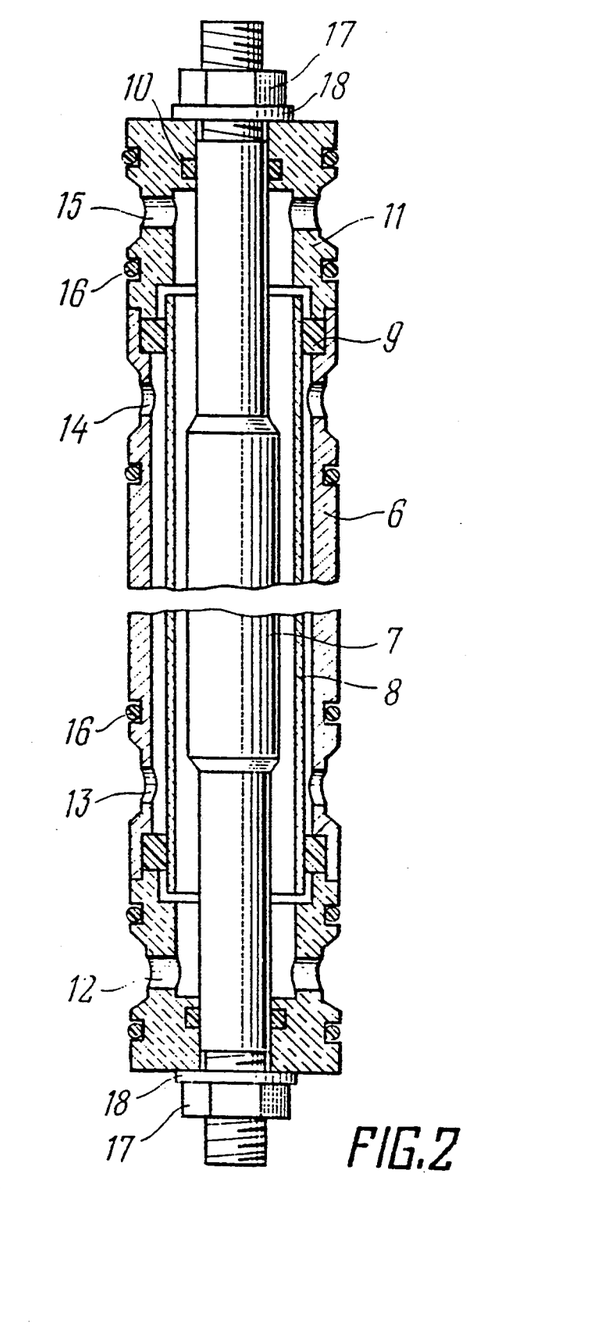
FIG. 2 shows the basic unit of the apparatus, an electrolytic cell of a domular type.

The apparatus functions as follows. The source water is separately fed from a container along water service lines through flowmeters to the anode and cathode chambers of the cell. The required ratios of the volumetric flows of catholyte and anolyte are set by the flowmeter. A source of current is switched on. After the electrochemical treatment is over, anolyte and catholyte pass through separate pipelines to containers-accumulators. The electrochemical water treatment is effected during a single water passage upwards in the cathode and anode chambers of the cell.

Table 1 presents the technical data of the apparatus with different number of electrolytic cells.

Figures 3A, 3B, 3C, 3D:
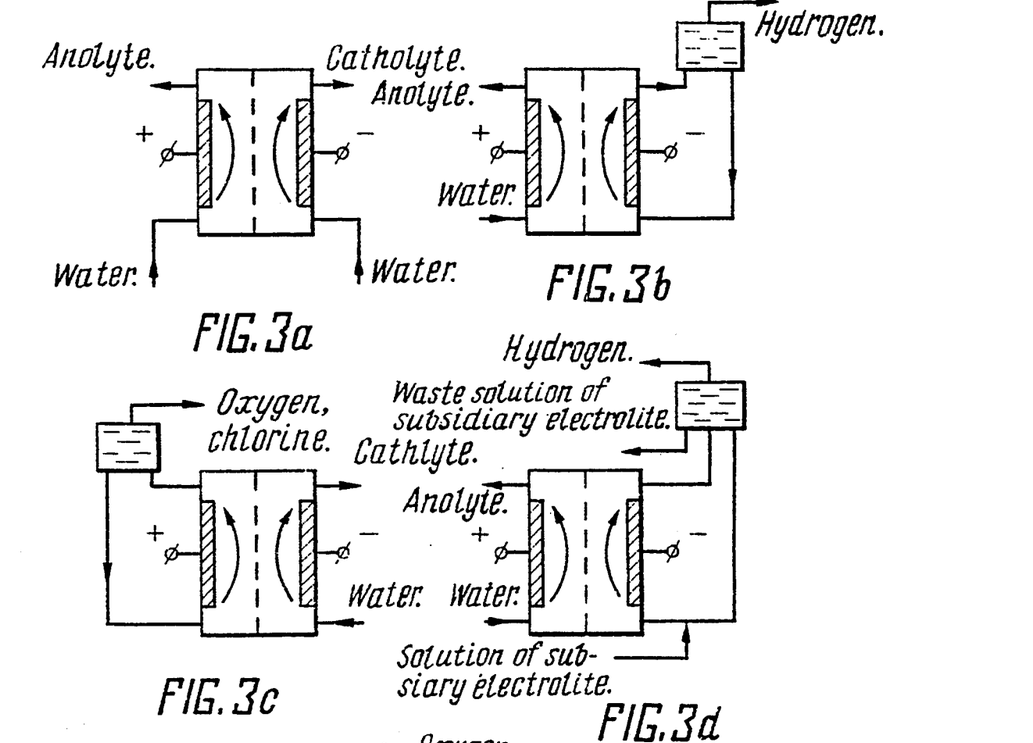
FIGS. 3a to 3e are the flow diagram of connecting the cells.
Figure 3E:
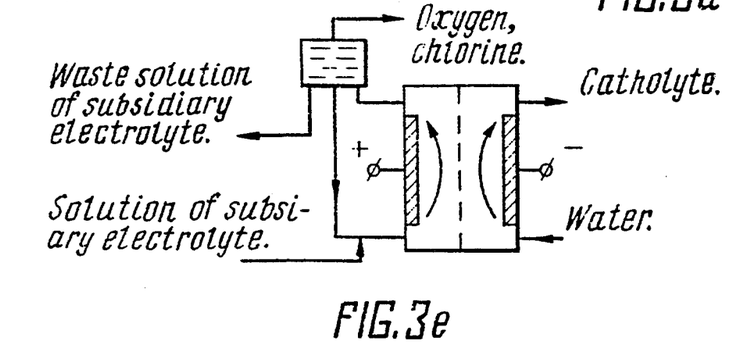

FIG. 3 shows the flow diagram of connecting the reactors. These connection circuits are the basic ones. Other circuits can be obtained by combining the components of the circuits in various configurations.

The volumetric flow rates of the anolyte and catholyte either the same or differ several times (from 2 to 100). Control of the volumetric flow rates of anolyte and catholyte can be effected by increasing the hydraulic resistance at the inlet lines into the reactor, more seldom, at the outlet lines. Water of different or the same mineralization can be fed to the anode and cathode chambers. The ratio of mineralization of the water flows fed to the anode and cathode chambers can be from 1 to 100 and more.

If during the electrolytic water treatment in the reactor it is required to prevent the electrical migration of ions into the water through the diaphragm from the chamber of the electrode of opposite polarity, it is necessary to increase water pressure in the chamber which is conventionally called "working" or "basic". The pressure increase is attained by increasing the hydraulic pressure at the outlet from the working chamber or by increasing the volumetric water flow rate. If, on the contrary, it is necessary to intensify the electromigration transfer of ions through the diaphragm into the working chamber, the pressure in the electrode chamber of the opposite polarity, called auxiliary, must be increased, or the pressure in the working chamber must be reduced.

Figure 4:
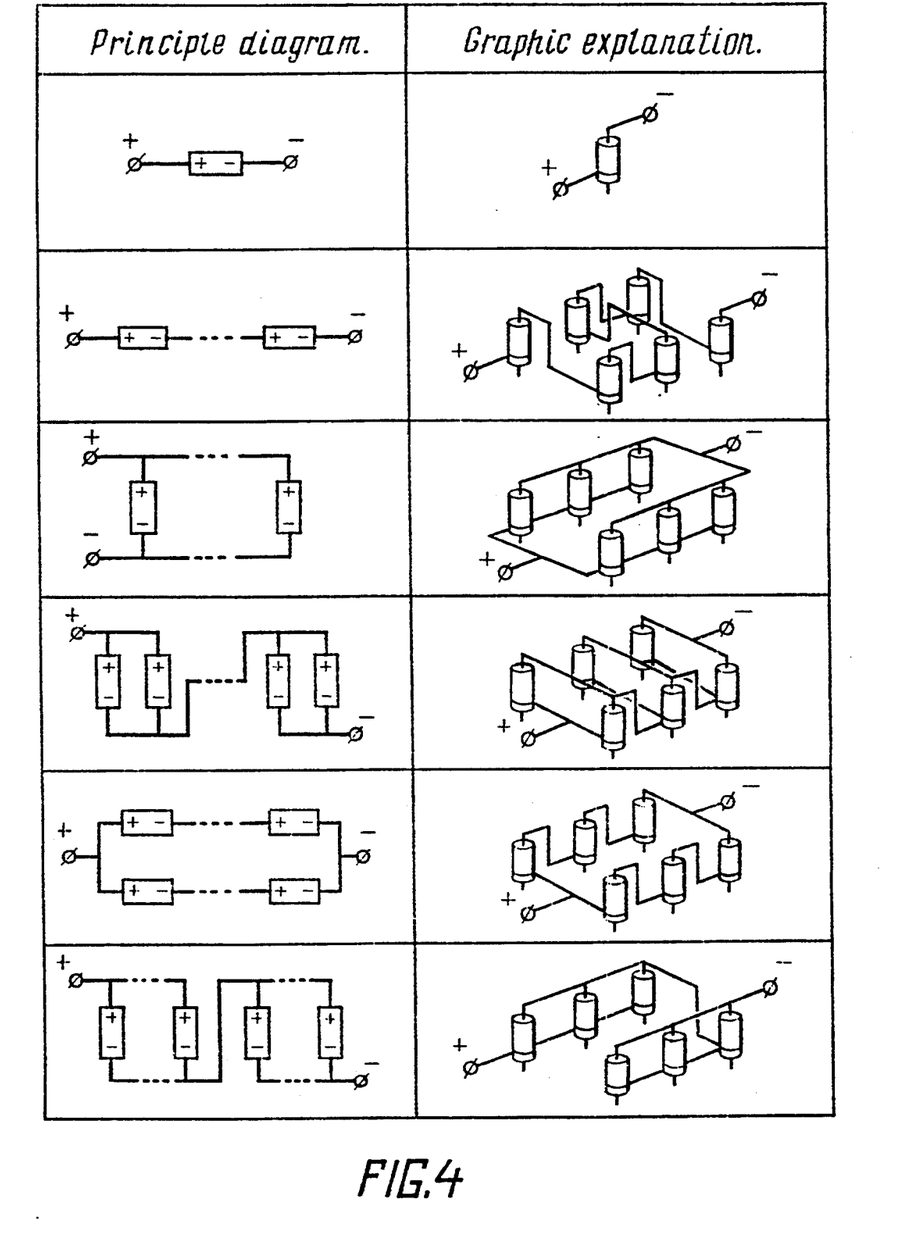
FIG. 4 shows the conventional circuit diagrams of connecting the cell electrodes in the apparatus.

Electrical interconnection of the cells is effected using typical curcuits shown in FIG. 4.

Series electrical connection of the cells is more preferable because a current of equal strength flows through all the cells irrespective of the different values of their resistance, and also because a considerable electrochemical power can be obtained without connecting a wire of a greater section to the reactor.

TABLE 1

| Parameters and characteristics | Number of cells in the reactor ||||| 
|---|---|---|---|---|---|
| | 1 | 2 | 4 | 8 | 10 |
| | 2 | 3 | 4 | 5 | 6 |
| Reactor capacity (volumetric flor rate of water passing through anode or cathode chamber, 1/h | 5–35 | 10–70 | 20–140 | 40–280 | 50–350 |
| Strength of direct current flowing through the apparatus, max, A with the cells connected in parallel | 10 | 20 | 40 | 80 | 100 |
| with the cells connected in series D.C. voltage, max, V | | 10 | 10 | 10 | 10 |
| with parallel connection of the cells | 100 | 100 | 100 | 100 | 100 |
| with series connection of | | 100 | 200 | 400 | 600 |
| treated water | 0.001 to 3.00 for all |||||
| Pressure in apparatus, kPa | 150 for all |||||
| Pressure difference at the diaphragm, max, kPa | 50 for all |||||
| Filtration surface, m$^2$ | 0.007 | 0.014 | 0.028 | 0.056 | 0.07 |
| Filtration coefficient of the diaphragm, 1/m$^2$ h Pa | 0.5 to 2.0 for all |||||
| Maximum temperature, °C. | |||||
| at the inlet | 35 for all |||||

TABLE 1-continued

| Parameters and characteristics | Number of cells in the reactor | | | | |
|---|---|---|---|---|---|
| | 1 | 2 | 4 | 8 | 10 |
| 1 | 2 | 3 | 4 | 5 | 6 |
| at the outlet | 40 for all | | | | |
| Service life at current density at the diaphragm, 100 A/m² h | 10000 for all | | | | |
| Overall dimensions, mm | 100 × 100 × 250 | 100 × 100 × 250 | 100 × 100 × 250 | 180 × 80 × 260 | 240 × 80 × 260 |
| Mass, kg % | 0.3 | 0.6 | 1.5 | 3.2 | 4.0 |

EXAMPLE 2

Figure 5:
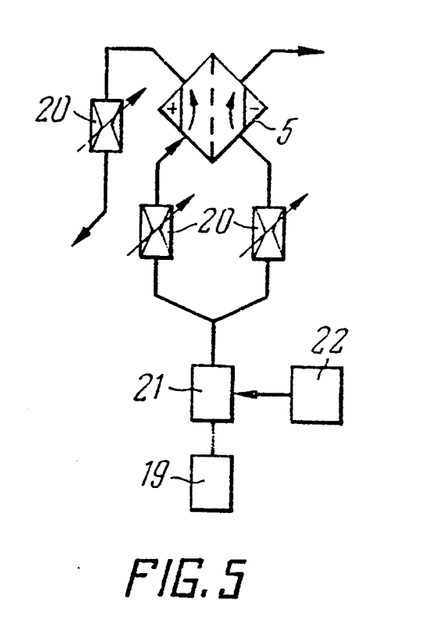
FIGS. 5 to 7 are the block diagrams of the preferred embodiments of the apparatus according to the present invention.

FIG. 5 shows the block-diagram of the apparatus for electrochemical water treatment.

The apparatus comprises at least one electrochemical cell 5 whose electrodes are connected to the terminals of a current source (not shown in the drawing) so that a cylindrical electrode 6 is the anode, and a rod electrode 7 is the cathode, a source 19 of the water being treated, to which the electrode chambers are connected in parallel, flow rate control devices 20 mounted at the water supply lines to the electrode chambers and at the lines of water discharge from the anode chamber. The apparatus also comprises a water-jet pump 21 for reagent metering, which is supplied from a container 22, said pump being mounted at the water supply line.

The apparatus functions as follows. The source water being treated is separately supplied from the source 19 through the flow rate control devices 20 to the electrode chambers of the reactor 5. The flow rate control devices 20 set the required ratios of the volumetric flows of catholyte and anolyte. The electric current is switched on. After the electrochemical treatment, the anolyte and catholyte are fed from the reactor through separate pipelines to containers-accumulators (not shown in the drawing). The electrochemical treatment conducted with all flow rate control devices (valves) 20 open permits of obtaining alkaline catholyte and acidic anolyte, with the slightly closed valves at the inlet and outlet from the anode chamber and the open valve at the inlet into the cathode chamber makes it possible to obtain neutral catholyte (pH=9), and with the slightly closed valve at the inlet to the cathode chamber and the open valves at the inlet and outlet of the anode chamber gives neutral anolyte (pH=7). The electrochemical treatment of water takes place during its single flow from below upwards in the cathode and anode chambers of the reactor.

Experimental data obtained in producing anolyte and catholyte from water of various mineralization with the apparatus of Example 2 are present in Table 2.

The solutions obtained can be used as disinfecting and detergent solutions in washing the pharmaceutical utensils, for pre-sterilization cleaning, for disinfecting and sterilizing medical instruments made from metal, rubber, glass, plastics, particularly, of endoscopes, scalpels, stomatologic bores, and the like.

TABLE 2

| Current consumption, Cl/l | anolyte pH | catholyte pH | ORP of anolyte | ORP of catholyte | Electric power consumption, kW h/m³ |
|---|---|---|---|---|---|
| Mineralization of 0.5 g/l | | | | | |
| 500 | 4.2 | 9.0 | +900 | −600 | 5.1 |
| 500 | 6.4 | 8.3 | +600 | −500 | 2.5 |
| 1000 | 3.5 | 10.1 | +950 | −700 | 10.2 |
| 1000 | 6.7 | 8.5 | +650 | −550 | 5.0 |
| 1500 | 3.0 | 10.3 | +1000 | −800 | 15.2 |
| 1500 | 7.0 | 8.8 | +700 | −600 | 10.0 |
| Mineralization of 1.5 g/l | | | | | |
| 500 | 3.8 | 10.2 | +1050 | −700 | 2.5 |
| 500 | 6.4 | 8.4 | +620 | −550 | 1.2 |
| 1000 | 3.0 | 11.3 | +1100 | −800 | 5.1 |
| 1000 | 6.6 | 8.6 | +670 | −600 | 2.5 |
| 1500 | 2.6 | 11.9 | +1150 | −350 | 7.6 |
| 1500 | 7.0 | 8.9 | +720 | −650 | 5.0 |
| Current consumption, Cl/l | anolyte pH | catholyte pH | ORP[1] of anolyte | ORF of catholyte | Electric power consumption, kW/h/M³ |
| Mineralization of 3.0 g/l | | | | | |
| 500 | 3.0 | 10.6 | +1100 | −800 | 1.3 |
| 500 | 6.3 | 8.5 | +630 | −600 | 0.6 |
| 1000 | 2.7 | 12.0 | +1150 | −820 | 2.7 |
| 1000 | 6.5 | 8.7 | +680 | −650 | 1.2 |
| 1500 | 2.3 | 12.2 | +1200 | −850 | 4.1 |
| 1500 | 6.9 | 9.0 | +730 | −750 | 2.5 |

[1]ORP is oxidation-reduction potential measured against the chlorine-silver reference electrode.

EXAMPLE 3

Figure 6:
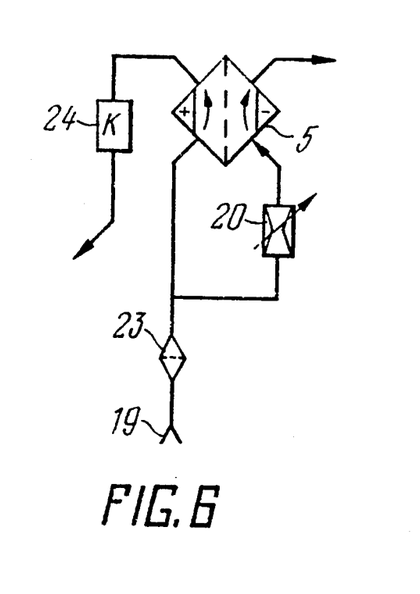

FIG. 6 presents the diagram of the apparatus for disinfecting and purifying water.

The apparatus comprises at least one cell 5 having its electrodes connected to the terminals of a current source (not shown in the drawings) so that a cylindrical electrode 6 is the anode and a rod electrode 7 is the cathode, a source 19 of water being treated, to which the electrode chambers are connected in parallel through a filter 23, a flow rate control device 20 mounted on the line of water feeding into the cathode chamber. The apparatus also comprises a container with a catalyst. 24, located at the line of water discharge from the anode chamber.

The apparatus functions as follows.

The water being treated is fed through the filter 23 from the head source 19 to the anode chamber of a module-type electrochemical flow reactor 5 operating under high pressure with a porous ultrafiltration ceramic diaphragm 8. During flow through the anode chamber, formation of compounds of active chlorine salts that constitute the natural mineralization of water takes place. The compounds of active chlorine kills entirely all microorganisms and oxidize organic impurities, thereby forming non-toxic and unhazardous substances for the man. After emerging from the anode chamber, water passes through a container 24 with a catalyst where the compounds of active chlorine are destructed.

The catalyst is made of a dense carbon material, as of graphite, with a thin layer (about 1 μm) of manganese dioxide applied to its surface. The rate of destruction of the active chlorine compounds on such a catalyst is 1.8 as high as on pyrolusite. A flow of water is directed through the container with the catalyst downwards, thereby ensuring a more uniform contact of all the water microvolumes with the surface of the catalyst particles than with any other direction of the flow.

Simultaneously, water is fed to the cathode chamber of the electrochemical reactor 5. Pressure in it is less than in the anode chamber because the flow rate control device 20 restrict the flow of water through the cathode chamber. Owing to this, heavy metal ions pass from the anode chamber to the cathode chamber under the action of electromigration forces and are discharged into drain.

99.9% of all microorganisms contained in water during 1.0 to 1.5 seconds are killed in the present apparatus.

Using the modular design it is possible to obtain readily any require capacity of the apparatus from 100 to 1500 l/h. The specific power consumption is not more than 0.2 kW h/10001.

EXAMPLE 4

Figure 7:
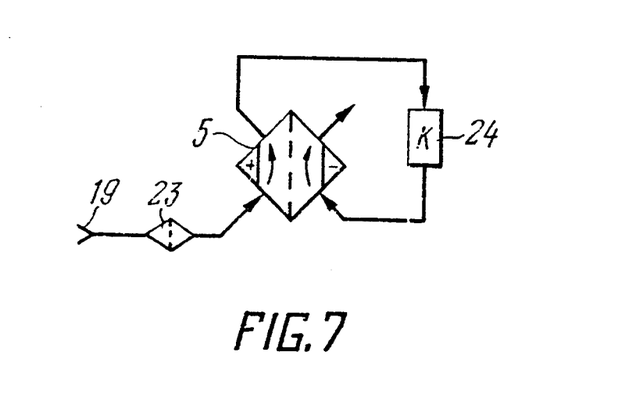

FIG. 7 illustrates the diagram of the apparatus for water disinfection and purification.

The apparatus comprises at least one electrochemical cell 5 having its electrodes connected to the terminals of a current source (not shown in the drawing) so that the cylindrical electrode 6 is the anode and the rod electrode 7 is the cathode, a source 19 of water being treated, to which the anode chamber is connected through a filter 23. The apparatus also comprises a line of overflow from the enode chamber to the cathode chamber at which a container with a catalyst 24 is disposed.

The apparatus functions as follows.

The water being treated is fed through the filter 23 from the head source 19 to the flow anode chamber to the electrochemical reactor operating under high pressure with a porous ultrafiltration ceramic diaphragm 8. During flow through the anode chamber, formation of active chlorine takes place from the salts which constitute the natural mineralization of water. The active chlorine compounds completely kill all microorganisms and oxidize the organic impurities with formation of non-toxic substances unhazardous for the man. After emerging from the anode chamber, water passes through the catalyst 24 where active chlorine disintegrates. Water flow through the container with the catalyst from the top downwards provides for a more uniform contact of all the microvolumes of the water with the surface of the catalyst particles than with any other direction of flow.

As in Example 3, the catalyst is made from graphite with a thin (about 1 m) layer of manganese dioxide.

Water is then arrives at the cathode chamber of the reactor 5, in which heavy metal ions turn to neutral atoms and become non-toxic for the man's organism because they enter into biological reactions of oxidation. In the cathode chamber of the apparatus, the oxidation-reduction potential is displaced to the level corresponding to the internal medium of the man's organism. As a result, the biological value of the water, its ability to penetrate into the cell membranes and to participate in the metabolism process are increased.

The apparatus of the present invention enables obtaining potable water from water of a high degree of contamination, which exceeds many times the ultimately admissible concentrations, with the exception of mechanical impurities.

Data on the water quality are presented in Table 3.

TABLE 3

| Parameters | Source water | Exceeding altimately admissible concentrations | Purified water |
| --- | --- | --- | --- |
| Total amount of bacteria in 1 ml water | 1000 | 100 times | normal |
| Amount of rodlike intestinal bacteria in 1 l | 300 | 100 times | normal |

TABLE 3-continued

| Parameters | Source water | Exceeding altimately admissible concentrations | Purified water |
| --- | --- | --- | --- |
| water Phenol content, mg/l | 0.1 | 100 times | normal |

Besides, with all other conditions being equal, the specific power consumption when treating tap water, according to the present invention, is 0.75 to 1.25 kW h/m³ as against 3.0 kW h/m³ in the known solutions to the problem.

INDUSTRIAL APPLICABILITY

The apparatus according to the present invention as against the closest prior-art apparatus permits of reducing electric power consumption, is more simple in manufacture because it lacks parts requiring much time for their manufacture and assembly, has a more simple and effective system of hydraulic connections which does not incorporate multiple-way cocks. It is also to be noted that the functional potentialities of the apparatus of the invention are wider due to design features and use of unified assemblies, which makes the apparatus to be readily assembled for various capacities depending on the conditions of the problems being solved. Water treatment in the apparatus according to the present invention makes it possible to obtain potable water from contaminated water due to both effectively proceeding purification and disinfection processes and control of water flow conditions through the apparatus and variations of water properties, and to obtain detergent and disinfecting solutions which can find wide application.

What is claimed is:

1. An apparatus for electrochemical water treatment comprising means for water supply and discharge, at least one electrochemical cell made of vertical coaxial cylindrical and rod electrodes mounted in dielectric sleeves, a ultrafiltration diaphragm made of a ceramic material based on zirconium oxide with additions of aluminium and yttrium oxides, said diaphragm being coaxially mounted in said sleeves between said electrodes and dividing an electrode spacing into electrode chambers, an upper and a lower sleeves being formed with ducts open to side surfaces of the sleeves to supply water to and discharge it from the rod electrode chambers, an upper and lower portions of the cylindrical electrode being formed with openings to supply water to and discharge it from the cylindrical electrode chamber, said sleeves and cylindrical electrode being of the same external diameter, a surface of the cylindrical electrode, respectively, over the opening in the lower portion and under the opening in the upper potion, and a surface of the sleeves, respectively, under and over the duct openings, being formed with grooves, and a current source connected to the electrodes through a switching unit, characterized in that said rod electrode is of variable cross-section, a diameter of its ends disposed at the level of the openings in the cylindrical electrode being 0.75 of the diameter of its middle portion, said diaphragm is mounted so that the geometrical dimensions of the cell satisfy the relationships:

$$\frac{K}{\ln(L)} = \frac{Ds}{Db} = \frac{8s}{8b} = 0.7 - 0.8$$

where

K=electrode spacing, mm,
L=distance between openings in the lower and upper portions of the cylindrical electrode, mm,
Ds=internal diameter of the cylindrical electrode, mm,
Db=diameter of the middle portion of the rod electrode, mm,
Ss, Sb=cross-sectional areas of the chambers, respectively, of the cylindrical and rod electrodes; the surface of the cylindrical electrode and the periphery of the sleeves being formed with annular recesses having openings for water supply and discharge.

2. An apparatus as claimed in claim 1, characterized in that said means for water supply and discharge are formed, respectively, as a lower and an upper header of a dielectric material with cylindrical sockets in each and with supply and discharge ducts, and said cell is rigidly secured in said sockets by means of resilient gaskets accommodated in the grooves of said sleeves and cylindrical electrode.

3. An apparatus as claimed in claim 1, characterized in that said headers have several sockets each, said cells mounted in the sockets being parallel connected hydraulically, and said switching unit being connected to the electrodes of of all said cells.

4. An apparatus as claimed in claim 1, characterized in that the headers are made as a built-up structure from units having one socket each and provided with means for sealing and bracing the structure.

5. An apparatus as claimed in claim 1, characterized in that said cells are electrically connected in series, or parallel, or series-parallel.

6. An apparatus as claimed in claim 1, characterized in that it comprises flow rate control devices mounted at the line of water supply to the cylindrical electrode chamber and/or to the rod electrode chamber, and/or at the outlet from the electrode chambers, 7. An apparatus as claimed in claim 1, characterized in that it additionally comprises a device for metering reagent mounted at the water supply line and made as, say, a water-jet pump.

8. An apparatus as claimed in claim 1, characterized in that the positive terminal of the current source is connected to the cylindrical electrode, and the negative terminal is connected to the rod electrode, said apparatus additionally comprising a container with a catalyst with an inlet in the upper portion and an outlet in the lower portion thereof, and the inlet of the container with a catalyst is connected with the outlet of the cylindrical electrode chamber.

9. An apparatus according to claim 8, characterized in that the water supply line is connected to the inlet of the cylindrical electrode chamber, and the outlet of the container with a catalyst is connected to the inlet into the rod electrode chamber.

10. In an apparatus for electrochemical treatment of water having at least one cell having a vertical tubular electrode, a rod electrode coaxially inside the tubular electrode and defining a space between the electrodes, a diaphragm coaxially between the electrodes and dividing the space between the electrodes radially into inner and outer chambers, upper and lower end dielectric sleeves respectively for supporting opposite ends of the electrodes and diaphragm, inner chamber water-supply means in the sleeves for supplying and discharging water for treatment to the inner chamber at the opposite ends of the rod electrode, and current means for supplying electric current from a switching unit to the electrodes, the improvements wherein:

the inner chamber water-supply means comprises ducts opening from side surfaces of the sleeves;

upper and lower portions of the tubular electrode have openings of an outer chamber water-supply means respectively for discharging and supplying more water for the treatment to the outer chamber;

diameters of the rod electrode respectively at the openings in the upper and lower portions of the tubular electrode are 0.75 of a diameter of a middle portion of the rod electrode therebetween;

the diaphragm is an ultrafiltration ceramic based on zirconium oxide with additions of aluminium and yttrium oxides; and $$\frac{K}{\ln(L)} = \frac{Ds}{Db} \text{ and } \frac{Ss}{Sb} = 0.7 - 0.8$$

wherein
K=the space between the electrodes in mm,
L=a distance between the openings in the upper and lower portions of the tubular electrode in mm,
Ds=an internal diameter of the tubular electrode in mm,
Db=the diameter of the middle portion of the rod electrode in mm, and
Ss, Sb=cross-sectional areas of the outer and inner chambers, respectively.

* * * * *